United States Patent
Jo et al.

(10) Patent No.: US 12,270,508 B1
(45) Date of Patent: Apr. 8, 2025

(54) MOUNTING DEVICE OF SIGNAL CHECKING APPARATUS FOR UNMANNED MARINE OBSERVATION APPARATUS

(71) Applicant: NATIONAL INSTITUTE OF METEOROLOGICAL SCIENCES, Seogwipo-si (KR)

(72) Inventors: Hyeong Jun Jo, Jeju-si (KR); Baek Jo Kim, Seoul (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/885,853

(22) Filed: Sep. 16, 2024

(30) Foreign Application Priority Data

Oct. 4, 2023 (KR) .................. 10-2023-0131514

(51) Int. Cl.
- *F16M 13/02* (2006.01)
- *B63B 22/00* (2006.01)
- *F16N 13/02* (2006.01)

(52) U.S. Cl.
CPC .............. *F16N 13/02* (2013.01); *B63B 22/00* (2013.01); *B63B 2022/006* (2013.01); *B63B 2201/26* (2013.01)

(58) Field of Classification Search
CPC .................. F16M 13/02; B63B 2027/165
See application file for complete search history.

(56) References Cited

U.S. PATENT DOCUMENTS

| 7,213,532 B1 * | 5/2007 | Simpson ................. B63C 11/42 |
| | | 114/333 |
| 12,134,443 B2 * | 11/2024 | Jo ............................ B63B 27/16 |
| 2018/0364386 A1 | 12/2018 | Fyffe et al. |

FOREIGN PATENT DOCUMENTS

| KR | 10-1025931 B1 | 3/2011 |
| KR | 10-1665313 B1 | 10/2016 |
| KR | 1020190043426 A | 4/2019 |
| KR | 102458469 B1 | 10/2022 |
| KR | 102535428 B1 | 5/2023 |

\* cited by examiner

*Primary Examiner* — Bradley Duckworth
(74) *Attorney, Agent, or Firm* — Bridgeway IP Law Group, PLLC; Jihun Kim

(57) ABSTRACT

A mounting device of a signal checking apparatus for an unmanned marine observation apparatus may comprise: a main body; a fixture that is detachably connected to the unmanned marine observation apparatus; and a signal checking apparatus holder that extends in at least one direction and is formed to mount a signal checking apparatus on one side thereof, wherein as the fixture is connected to a portion of the unmanned marine observation apparatus, the signal checking apparatus mounted on the signal checking apparatus holder allows the unmanned marine observation apparatus to check signal transmission of the unmanned marine observation apparatus at a fixed position with respect to a portion of the unmanned marine observation apparatus.

4 Claims, 7 Drawing Sheets

MOUNTING DEVICE OF SIGNAL CHECKING APPARATUS FOR UNMANNED MARINE OBSERVATION APPARATUS

CROSS-REFERENCE TO RELATED APPLICATIONS

This application claims the priority of Korean Patent Application No. 10-2023-0131514 filed on Oct. 4, 2023, in the Korean Intellectual Property Office, the disclosure of which is incorporated herein by reference.

BACKGROUND

Field

The present disclosure relates to a mounting device of a signal checking apparatus for an unmanned marine observation apparatus.

Description of the Related Art

Since typical marine observation is more difficult than atmospheric observation and involves enormous costs, marine observation data is very scarce compared to atmospheric observation data. With the development of remote observation using artificial satellites, the marine observation blank has been largely removed horizontally, but there are still limitations in understanding the internal structure of the ocean because observations are limited to the surface layer.

The unmanned marine observation apparatus observes the marine environment by repeatedly sinking to a certain depth and then rising according to a set cycle. The Korea Meteorological Administration has also participated in the Earth marine observation project (ARGO) since 2001, at the beginning of the project, and has dropped a number of unmanned marine observation apparatuses to the coastal waters of the Korean Peninsula and the Northwestern Pacific Ocean, focusing on the East Sea, and has operated a regional data center to perform data processing, quality management, etc.

As illustrated in FIG. 1, the unmanned marine observation apparatus 2000 may generate GPS information from GPS signals transmitted from GPS signal satellites, and has a sensor and antenna mounted on a top thereof to communicate with the satellites.

The operation of dropping such unmanned marine observation apparatus into the sea is mainly carried out using merchant ships and Korea Meteorological Administration weather observation vessels. Due to the nature of the equipment, a power supply of equipment is enabled on a ship, and the equipment is subjected to basic tests and then dropped. In this process, it is necessary to test whether signals are transmitted between the observation apparatus and the satellite, which is performed through a beeper (signal checking apparatus). By converting a signal into sound through the beeper, it is possible to check whether the signal is transmitted from the observation apparatus to the satellite. This is the most important part of the test process because it is related to the transmission of the observation data after the equipment is dropped. The beeper is placed around the antenna to ensure that the signal may be detected well, thereby performing the transmission test.

However, due to the nature of the unmanned marine observation apparatus, there are no suitable locations to mount the unmanned marine observation apparatus around the antenna, and the unmanned marine observation apparatus is performed on a ship and therefore is difficult to be mounted due to the shaking of the ship. Accordingly, there is the inconvenience of the user having to hold the unmanned marine observation apparatus and testing equipment directly until the test is completed. In addition, since the beeper often falls off from the unmanned marine observation apparatus, there is a problem in that testing should be performed by hanging a number of beepers around the antenna as illustrated in FIG. 2.

The sensor provided at the top of the unmanned marine observation apparatus may be powered on only when the magnet is removed from the sensor, test whether the signals are transmitted, and only function when dropped into the sea with the magnet removed. However, after testing whether or not the signals are transmitted, there are cases where the unmanned marine observation apparatus may not operate normally due to being dropped with the magnet attached to the sensor.

In addition, since the sensor performs very sensitive sensing because it should detect the marine environment within the sea, the sensor is supplied after being blocked with a plug when supplied after manufacturing. When the unmanned marine observation apparatus drops into the sea without removing the plug, the unmanned marine observation apparatus may not operate normally, and the test on whether the unmanned marine observation apparatus operates will be conducted in an unsafe environment. There are cases where the unmanned marine observation apparatus is dropped into the sea without removing the plug because there is not enough time to drop the unmanned marine observation apparatus after testing its operation.

Accordingly, there is a need for a device capable of improving the accuracy of signal confirmation by mounting the beeper on the observation apparatus, minimizing the inconvenience of the user having to mounting the beeper directly around the antenna, and promoting the user safety.

The background technology of the present disclosure is disclosed in Korean Patent No. 10-1665313.

SUMMARY

An object to be achieved by the present disclosure is to provide a mounting device of a signal checking apparatus for an unmanned marine observation apparatus that includes a main body, a fixture that is detachably connected to the unmanned marine observation apparatus, and a signal checking apparatus holder extending in at least one direction and formed to mount a signal checking apparatus on one side thereof, in which as the fixture is connected to a portion of the unmanned marine observation apparatus, the signal checking apparatus mounted on the signal checking apparatus holder allows the unmanned marine observation apparatus to check signal transmission of the unmanned marine observation apparatus at a fixed position with respect to a portion of the unmanned marine observation apparatus, thereby stably mounting the signal checking apparatus required during a communication test process between the unmanned marine observation apparatus and a satellite before the unmanned marine observation apparatus is dropped into the sea.

Further, another object to be achieved by the present disclosure is to provide a mounting device of a signal checking apparatus for an unmanned marine observation apparatus that does not require a worker to directly hold the signal checking apparatus when testing communication of the unmanned marine observation apparatus.

In addition, another object to be achieved by the present disclosure is to provide a mounting device of a signal checking apparatus for an unmanned marine observation apparatus capable of checking whether a magnet for operation of the unmanned marine observation apparatus is removed and whether a plug covering a sensor is removed.

In addition, another object to be achieved by the present disclosure is to provide a mounting device of a signal checking apparatus for an unmanned marine observation apparatus capable of minimizing the risk of dropping the unmanned marine observation apparatus into the sea without removing a magnet or a plug from the unmanned marine observation apparatus.

However, the technical problems to be achieved by the embodiments of the present disclosure are not limited to the technical problems as described above, and other technical problems may exist.

According to an aspect of the present disclosure, there is provided a mounting device of a signal checking apparatus for an unmanned marine observation apparatus, including: a main body; a fixture that is detachably connected to the unmanned marine observation apparatus; and a signal checking apparatus holder that extends in at least one direction and is formed to mount a signal checking apparatus on one side thereof, in which as the fixture is connected to a portion of the unmanned marine observation apparatus, the signal checking apparatus mounted on the signal checking apparatus holder allows the unmanned marine observation apparatus to check signal transmission of the unmanned marine observation apparatus at a fixed position with respect to a portion of the unmanned marine observation apparatus.

Further, according to an embodiment, the fixture may include: a gripping element that is provided to surround at least a portion of the unmanned marine observation apparatus; and an operating element that controls the gripping element so that the gripping element clamps a portion of the unmanned marine observation apparatus.

Further, according to an embodiment, the mounting device may further include: a state inspection unit that inspects a state before the unmanned marine observation apparatus is dropped, in which the state inspection unit may inspect one or more of whether a magnet for operating a sensor of the unmanned marine observation apparatus is removed and whether a plug covering the sensor is removed.

Further, according to an embodiment, the state inspection unit may include: a storage box that has an internal space; and a storage sensor that detects whether the magnet and plug are loaded in the storage box.

Further, according to an embodiment, it may be controlled whether the gripping element release the clamping depending on a loading state in the storage box detected by the storage sensor.

Further, according to an embodiment, the mounting device may further include: a plug separation unit that separates the plug covering the sensor of the unmanned marine observation apparatus from the sensor, in which the plug separation unit may be provided to separate the plug according to the clamping release of the gripping element.

Further, according to an embodiment, the plug separation unit may include: an extension element that extends from the main body toward the unmanned marine observation apparatus; and a separation element that extends from one end of the extension element toward the plug, in which at least a portion of the separation element may be inserted between the plug and the unmanned marine observation apparatus as the gripping element releases the clamping and moves to one side to separate the plug.

The means for solving the problem described above are merely exemplary and should not be construed as limiting the present disclosure. In addition to the exemplary embodiments described above, additional embodiments may exist in the drawings and detailed description of the present disclosure.

According to the present disclosure, it is possible to provide the mounting device of a signal checking apparatus for an unmanned marine observation apparatus includes the main body, the fixture that is detachably connected to the unmanned marine observation apparatus, and the signal checking apparatus holder extending in at least one direction and formed to mount the signal checking apparatus on one side thereof, in which as the fixture is connected to a portion of the unmanned marine observation apparatus, the signal checking apparatus mounted on the signal checking apparatus holder allows the unmanned marine observation apparatus to check the signal transmission of the unmanned marine observation apparatus at the fixed position with respect to a portion of the unmanned marine observation apparatus, thereby stably mounting the signal checking apparatus required during the communication test process between the unmanned marine observation apparatus and the satellite before the unmanned marine observation apparatus is dropped into the sea.

Further, according to the present disclosure, it is possible to provide the mounting device of a signal checking apparatus for an unmanned marine observation apparatus that does not require a worker to directly hold the signal checking apparatus when testing the communication of the unmanned marine observation apparatus.

In addition, according to the present disclosure, it is possible to check whether the magnet for the operation of the unmanned marine observation apparatus is removed and whether the plug covering the sensor is removed.

In addition, according to the present disclosure, it is possible to minimize the risk of dropping the unmanned marine observation apparatus into the sea without removing the magnet or plug from the unmanned marine observation apparatus.

However, the effects achievable by the embodiments of the present disclosure are not limited to the technical problems described above, and other effects may exist.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
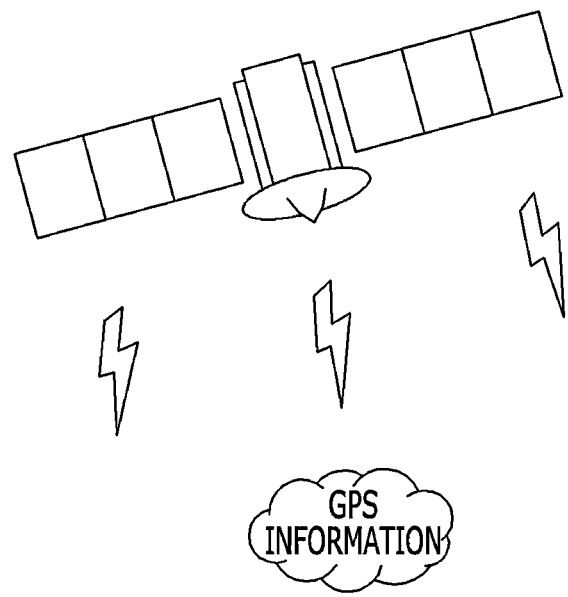
FIG. 1 is a diagram illustrating a conventionally used unmanned marine observation apparatus.
Figure 1:
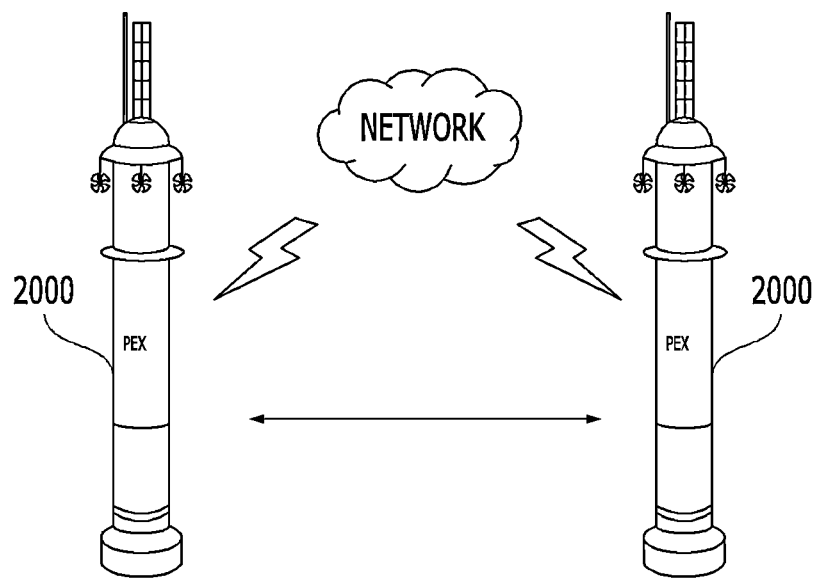
Figure 2:
FIG. 2 is a diagram illustrating several signal checking apparatuses mounted for signal testing of the conventional unmanned marine observation apparatus.

Hereinafter, exemplary embodiments of the present disclosure will be described in detail with reference to the accompanying drawings so that those skilled in the art to which the present disclosure pertains may easily practice. However, the present disclosure may be implemented in various different forms, and is not limited to the embodiments described herein. In addition, in the drawings, portions unrelated to the description will be omitted to clearly describe the present disclosure, and similar portions will be denoted by similar reference numerals throughout the specification.

Throughout the present specification, when any part is referred to as being "connected to" another part, it means that any one part and another part are "directly connected to" each other or are "electrically connected to" each other with the other part interposed therebetween.

Throughout the present specification, when any member is referred to as being positioned "on", "at upper portion", "at upper end", "below", "at lower portion", "at lower end" of another member, it includes not only a case in which any member and another member are in contact with each other, but also a case in which the other member is interposed between any member and another member.

Throughout the present specification, "including" any component will be understood to imply the inclusion of other components rather than the exclusion of other components, unless explicitly described to the contrary.

In addition, in the description of the embodiments of the present disclosure, terms (upper side, upper surface, lower side, etc.) related to directions or positions are set based on an arrangement state of each component illustrated in the drawings. For example, referring to FIG. 3, a 12 o'clock direction may be generally understood as an upward direction.

Figure 3:
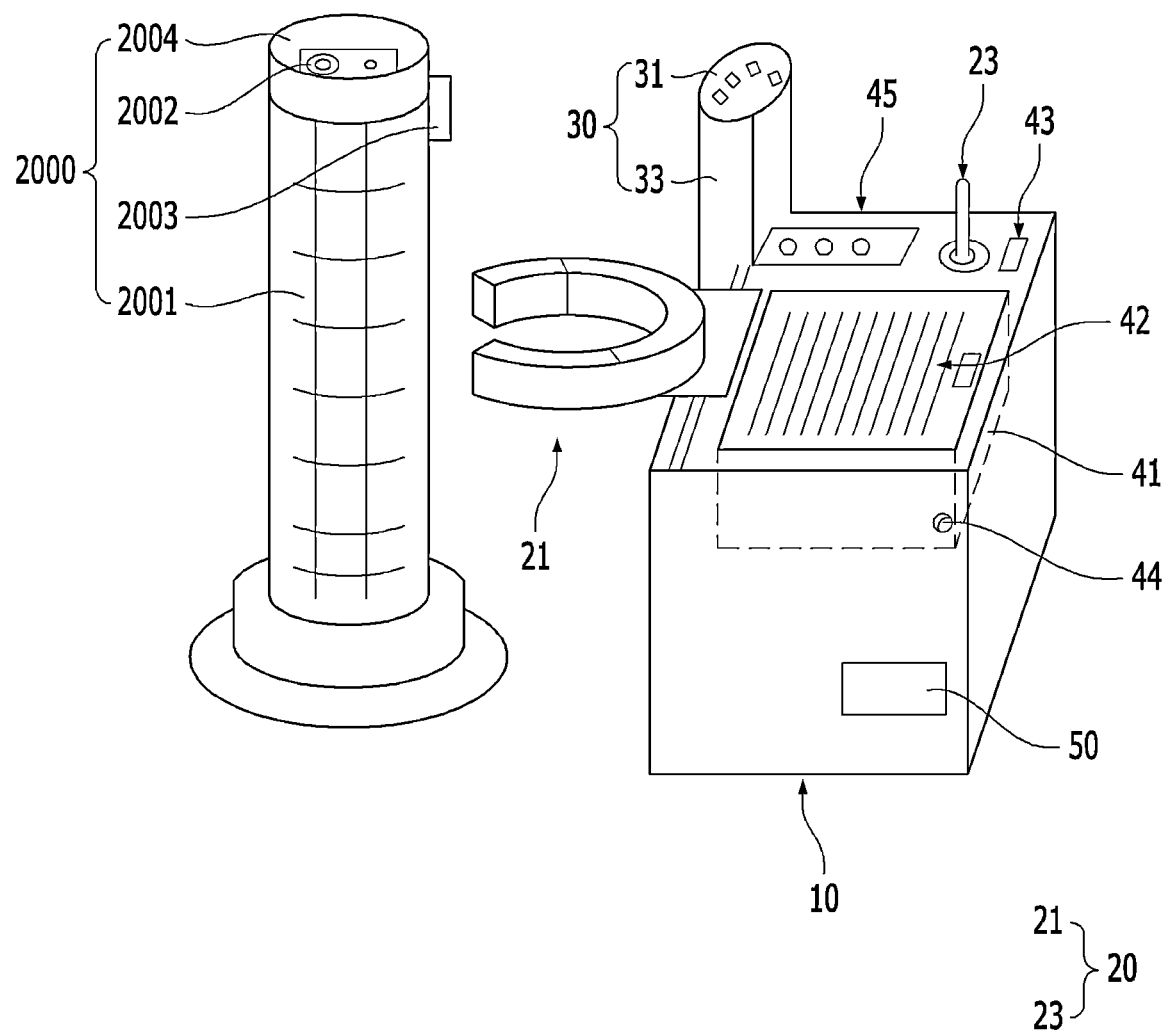
FIG. 3 is a perspective view of a mounting device of a signal checking apparatus for an unmanned marine observation apparatus according to an embodiment of the present disclosure.

First, referring to FIGS. 1 and 3, an unmanned marine observation apparatus 2000 is dropped into the sea and periodically repeats falling and rising to sense a marine environment, and may include a sensor housing 2001 that is provided on an upper side of the unmanned marine observation apparatus 2000, and sensor 2002, a magnet 2003, and a plug 2004 that are disposed within the sensor housing.

The sensor housing 2001 may extend from the upper side of the unmanned marine observation apparatus 2000 while having a predetermined cross-section. The sensor housing 2001 has an approximately constant cross-section and may extend upward. The sensor housing 2001 may have different lengths and thicknesses depending on a manufacturer that manufactures the sensor housing 2001 or the unmanned marine observation apparatus 2000.

The sensor 2002 is disposed within the sensor housing 2001 and senses the marine environment.

The magnet 2003 may be disposed on one side of the sensor 2003 or disposed inside the sensor housing 2001, or may be provided in other portions of the unmanned marine observation apparatus 2000. The sensor is powered on only when the magnet 2003 is removed from the unmanned marine observation apparatus 2000.

The plug 2004 is provided to cover the sensor 2002, and in one embodiment, it may be supplied in a state that blocks an upper surface of the sensor housing 2001. When dropping the unmanned marine observation apparatus 2000, the plug 2004 may be removed from the sensor housing 2001.

Referring to FIG. 3, the mounting device 1 of a signal checking apparatus for an unmanned marine observation apparatus (1) according to an embodiment of the present application may stably mount the signal checking apparatus (the beeper) required during a communication test process between the unmanned marine observation apparatus 2000 and a satellite before the unmanned marine observation apparatus 2000 is dropped into the sea to solve the problem of a worker having to directly hold the signal checking apparatus and may check whether the magnet 2003 is removed for operation of the unmanned marine observation apparatus 2000 and whether the plug 2004 covering the sensor 2002 is removed to minimize the risk of dropping the unmanned marine observation apparatus 2000 into the sea without removing the magnet or plug from the unmanned marine observation apparatus 2000.

The unmanned marine observation apparatus 2000 may be understood as an ARGO float. The mounting device 1 of a signal checking apparatus for an unmanned marine observation apparatus may include a main body 10, a fixture 20, a signal checking apparatus holder 30, a state inspection unit 40, and a control unit 50. In another embodiment as described later, the mounting device 1 of a signal checking apparatus for an unmanned marine observation apparatus may further include a plug separation unit 60.

The main body 10 may substantially form the appearance of the mounting device 1 of a signal checking apparatus for an unmanned marine observation apparatus. The main body 10 has a predetermined cross-section and may extend in at least one direction, and may be configured to include components such as the fixture 20, the signal checking apparatus holder 30, and the state inspection unit 40, which will be described later, and may be formed to extend in at least one direction from its surface.

In one embodiment, the main body 10 may have a predetermined depth and width and a pillar shape extending parallel to the direction in which the sensor housing 2001 extends. However, the shape of the main body 10 is not limited to that shown, and it is enougth once the main body 10 may be formed to the extent of the unmanned marine observation apparatus 2000 while being detachably connected to a portion of the unmanned marine observation apparatus 2000 through the fixture 20. For example, when the main body 10 is connected to the unmanned marine observation apparatus 2000, the main body 10 may have a shape that has a center of gravity to prevent the unmanned marine observation apparatus 2000 from falling or prevent the mounting device 1 of a signal checking apparatus for an unmanned marine observation apparatus from shaking.

The fixture 20 extends from the main body 10 to one side, preferably toward the sensor housing 2001 of the unmanned marine observation apparatus 2000 to be detachably connected to the unmanned marine observation apparatus, so the mounting device 1 of a signal checking apparatus for an unmanned marine observation apparatus according to the present disclosure may be connected to the unmanned marine observation apparatus 2000 and check signal transmission of the unmanned marine observation apparatus at a position where the signal checking apparatus is fixed to a portion of the unmanned marine observation apparatus. The fixture 20 may include a gripping element 21 and an operating element 23.

Figure 4:
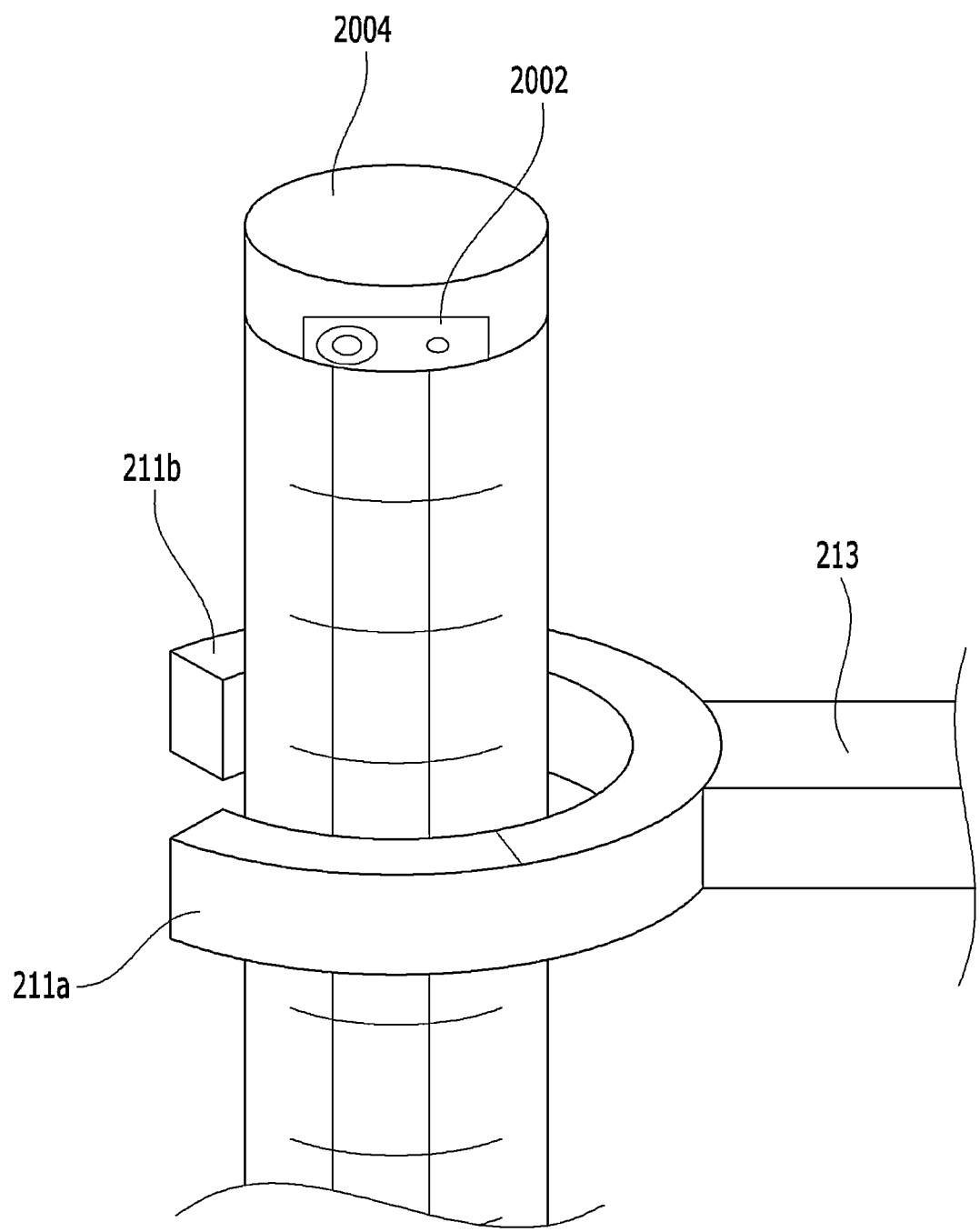
FIG. 4 is a diagram illustrating that a gripping element 21 clamps a sensor housing 2001 of the unmanned marine observation apparatus according to an embodiment of the present disclosure.

Referring to FIGS. 3 and 4, the gripping element 21 may be provided to surround at least a portion of the unmanned marine observation apparatus. In a preferred embodiment, the gripping element 21 may be formed to surround at least a portion of the sensor housing 2001.

The gripping element 21 may clamp the sensor housing 2001 under control of the operating element 23, which will be described later. In one embodiment, the sensor housing 2001 may extend vertically in a substantially cylindrical shape, and the gripping element 21 may be provided to clamp a portion of the cylindrical sensor housing 2001.

The gripping element 21 may include clamps 211a and 211b surrounding the sensor housing 2001 and an arm 213 extending from the main body 10.

A pair of clamps 211a and 211b may clamp a sensor housing 2001 having a different radius and shape under the control of the operating element 23, which will be described later. A distance between the pair of clamps 211a and 211b may increase or decrease under the control, so the sensor housing 2001 between the pair of clamps may be clamped.

The arm 213 may extend from the main body 10 to the sensor housing 2001, and may be provided to have a variable length extending from the main body under the control. In another embodiment, the length of the arm 213 may not change, and the length in which the arm extends from the main body may vary and the direction in which the arm extends from the main body may also vary.

In one embodiment, after testing the unmanned marine observation apparatus 2000 through the signal checking apparatus, the clamping is released, and the operator moves the mounting device 1 of a signal checking apparatus for an unmanned marine observation apparatus from the unmanned marine observation apparatus 2000, so the connection between mounting device 1 of a signal checking apparatus for an unmanned marine observation apparatus and the unmanned marine observation apparatus 2000 may be released.

The operating element 23 may control the gripping element 21 so that the gripping element 21 clamps a portion of an unmanned marine observation apparatus. The operating element 23 may control a pair of clamps 211a and 211b, or may control the extension length or extension angle of the arm 213 from the main body 10 together with the clamp. Accordingly, the gripping element 21 may clamp the sensor housing 2001, and the clamping may be released under the control.

Referring back to FIG. 3, the signal checking apparatus holder 30 may mount the signal checking apparatus to check the signal transmission of the unmanned marine observation apparatus through the signal checking apparatus. The signal checking apparatus holder 30 may be disposed on one side of the main body 10, and in one embodiment, may be formed to extend in a vertical direction from one surface (that is, it may be understood as the direction in which the fixture extends) of the main body 10 in the direction facing the unmanned marine observation apparatus 2000. However, the arrangement and shape of the signal checking apparatus holder 30 are not limited thereto, and the signal checking apparatus holder 30 may be understood as being provided to mount the signal checking apparatus at an appropriate position to check the smooth signal transmission of the unmanned marine observation apparatus 2000 and to prevent the mounted signal checking apparatus from shaking or falling off. The signal checking apparatus holder 30 may include a holding element 31 and a column 33.

The mounting element 31 may be provided to mount the signal checking apparatus therein or thereon. As described above, even if the plurality of conventional signal checking apparatuses (beepers) are mounted around the antenna, the signal checking apparatus is likely to fall off. However, in the case of the present disclosure, it may mount the signal checking apparatus and have a shape that makes it easy to maintain the mounting of the signal checking apparatus.

In one embodiment, the mounting element 31 may have a groove capable of receiving at least a portion of an outer surface of the signal checking apparatus, or may have a mounting maintenance means that may be understood by a person skilled in the art, such as a push button type or a belt type which may maintain the mounting of the signal checking apparatus. Through this, the mounting element 31 may mount one or more signal checking apparatuses. To facilitate the signal transmission with the satellite, the mounting element 31 may mount the signal checking apparatus on its upper side.

The column 33 may extend from one side of the main body 10 or from the main body in at least one direction. In one embodiment, the extension direction of the column 33 may be a vertical direction. Alternatively, the column 33 may extend upward from the main body. The column 33 may be extended to allow the mounting element 31 to mount the signal checking apparatus within a predetermined range compared to the antenna side or the top side of the sensor housing 2001, enabling more accurate testing through the signal checking apparatus.

Accordingly, the signal checking apparatus holder 30 may extend as a whole in the vertical direction and may mount the signal checking apparatus on the upper side.

The state inspection unit 40 may be provided to inspect the state before the unmanned marine observation apparatus 2000 is dropped. In this case, the pre-drop state refers to a stat in which it is possible to inspect whether the unmanned marine observation apparatus 2000 may perform the normal marine environment observations when dropped into the sea.

As described above, in order to operate the unmanned marine observation apparatus 2000 or the sensor 2002, the magnet 2003 needs to be removed, and in order for the sensor 2002 to sense the marine environment within the ocean, the plug 2004 covering the sensor 2002 needs to be removed. In one embodiment, the state inspection unit 40 may check whether at least one of the magnet 2003 and the plug 2004 is removed, preferably whether the magnet is removed and whether the plug is removed. The state inspection unit 40 may include a storage box 41, an opening/closing slide 42, an opening/closing switch 43, a storage sensor 44, and a state indicator light 45.

Figure 5:
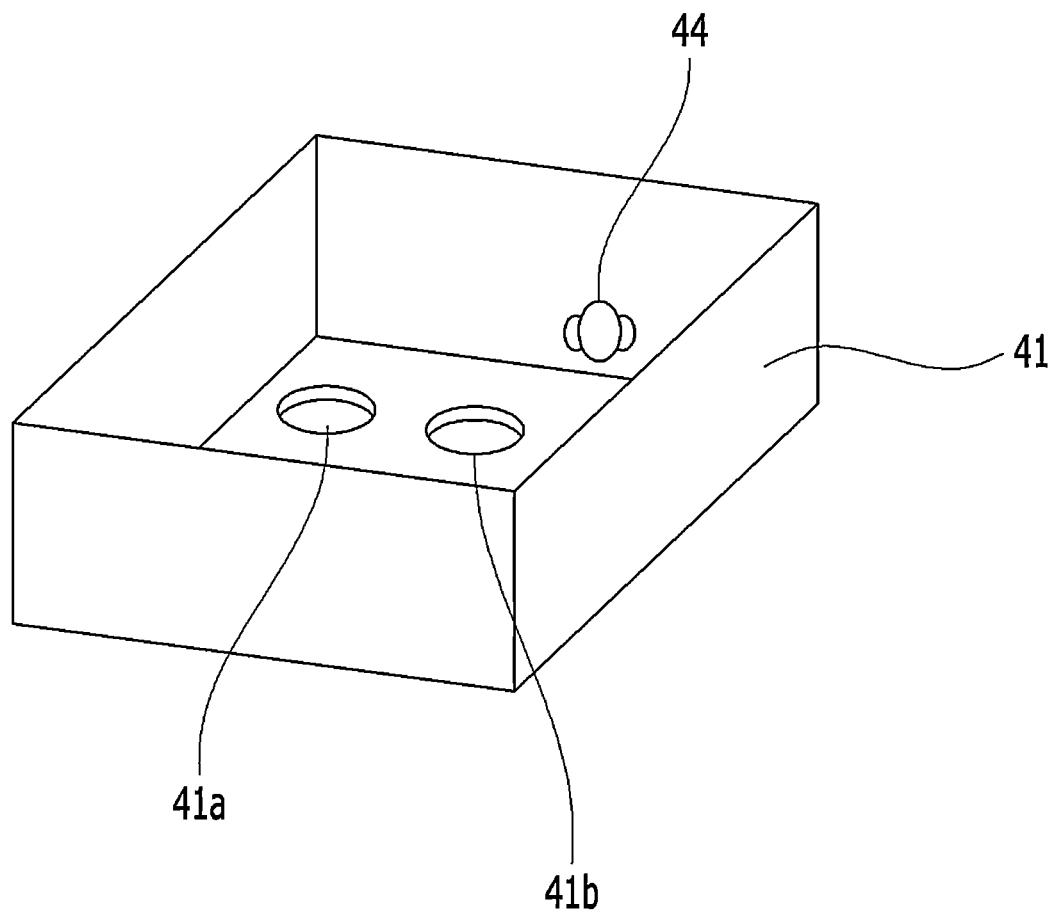
FIG. 5 is a diagram illustrating a storage box 41 according to an embodiment of the present disclosure.

Referring to FIGS. 3 and 5, the storage box 41 has an internal space and may be provided to load one or more of the magnet 2003 and the plug 2004 therein. The storage box 41 is provided in a predetermined space within the main body 10 and may have an opening so that the magnet 2003 or plug 2004 may be inserted into the storage box from the outside. This opening may be closed at least temporarily through the opening/closing slide 42, and the opening/closing of the storage box through the opening/closing slide 42 may be performed by operating the opening/closing switch 43.

In the embodiment illustrated in FIG. 5, the storage box 41 may include a magnet loading part 41a for loading the magnet 2003 and a plug loading part 42b for loading the plug 2004, in which the magnet loading part 41a and the plug loading part 41b may be provided to accommodate or fix the magnet and plug, respectively, so that the magnet and plug are loaded at the designated positions in the storage box.

The storage sensor 44 may be provided to detect whether the magnet and plug are loaded in the storage box. In one embodiment, the storage sensor 44 may sense the magnet accommodated or fixed in the magnet loading part 41a and the plug accommodated or fixed in the plug loading part 41b. In addition, even if the magnet or plug is not accommodated in the magnet loading part 41a or the plug loading part 41b, it may be sensed whether the magnet or plug is positioned in the storage box 41. The storage sensor 44 may be an infrared sensor, a motion sensor, or a pressure sensor provided on the magnet loading part 41a or the plug loading part 41b, and may be understood as being a sensor that separately senses the magnets or plug loaded in the storage box.

The state indicator light 45 may visualize the loading state in the storage box 41 so that the loading state may be identified from the outside. The state indicator light 45 may display different indications depending on the sensing results of the storage sensor 44. Therefore, the operator may check the storage state in the storage box through the display state of the state indicator light 45, and thus, check whether the plug and magnet have been removed.

In one embodiment, when the storage box 41 is empty, the state indicator light 45 may turn on a red light. In this state, when the mounting device 1 of a signal checking apparatus for an unmanned marine observation apparatus is separated from the unmanned marine observation apparatus 2000, a warning sound may be generated. That is, after separating the plug and magnet from the unmanned marine observation apparatus 2000, the plug and magnet may be stored in the storage box 41. By separating the plug and magnet from the unmanned marine observation apparatus 2000 while the plug and magnet are stored in the storage box, it is possible to prevent the unmanned marine observation apparatus 2000 from being dropped into the sea without the plug and magnet being separated from the sensor.

Referring back to FIG. 3, the control unit 50 may control each component of the mounting device 1 of a signal checking apparatus for an unmanned marine observation apparatus according to an embodiment of the present application. In one embodiment, the control unit 50 may control the operation of the gripping element 21 through the operating element 23, the clamping control of the gripping element 21, and the availability of the opening/closing of the storage box 41, etc.

The control unit 50 may control whether to release the clamping of the gripping element 21 according to the loading state in the storage box 41 detected by the storage sensor 44.

In one embodiment, it senses whether the magnet 2003 and the plug 2004 are loaded in the storage box 41, and when the magnet and the plug are not loaded in the storage box, the movement of the gripping element 21 or the manipulation of the operating element 23 may be controlled so that the gripping element 21 does not release the clamping of the sensor housing 2001. That is, the clamping of the sensor housing 2001 may be released only when the magnet 2003 and plug 2004 are removed from the unmanned marine observation apparatus 2000 and then stored in the storage box 41.

In another embodiment, after determining whether the magnet 2003 is loaded in the storage box, the releasing of the clamping may be controlled depending on whether the magnet is loaded, and the removal of the plug is performed by the plug separation unit 60, which will be described later.

Figure 6:
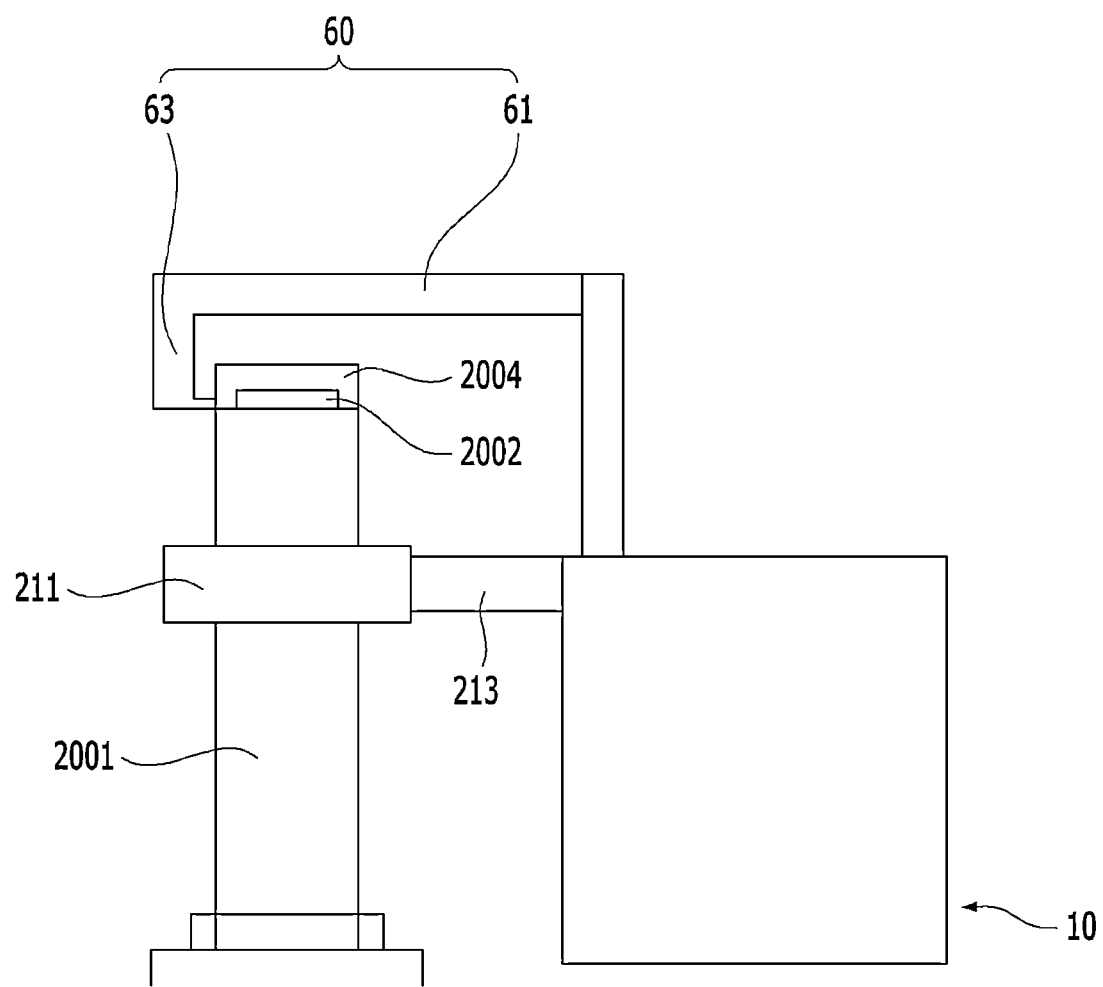
FIG. 6 is a diagram illustrating that a fixture 20 and a plug separation unit 60 extend from a main body 10 according to an embodiment of the present disclosure.
Figure 7:
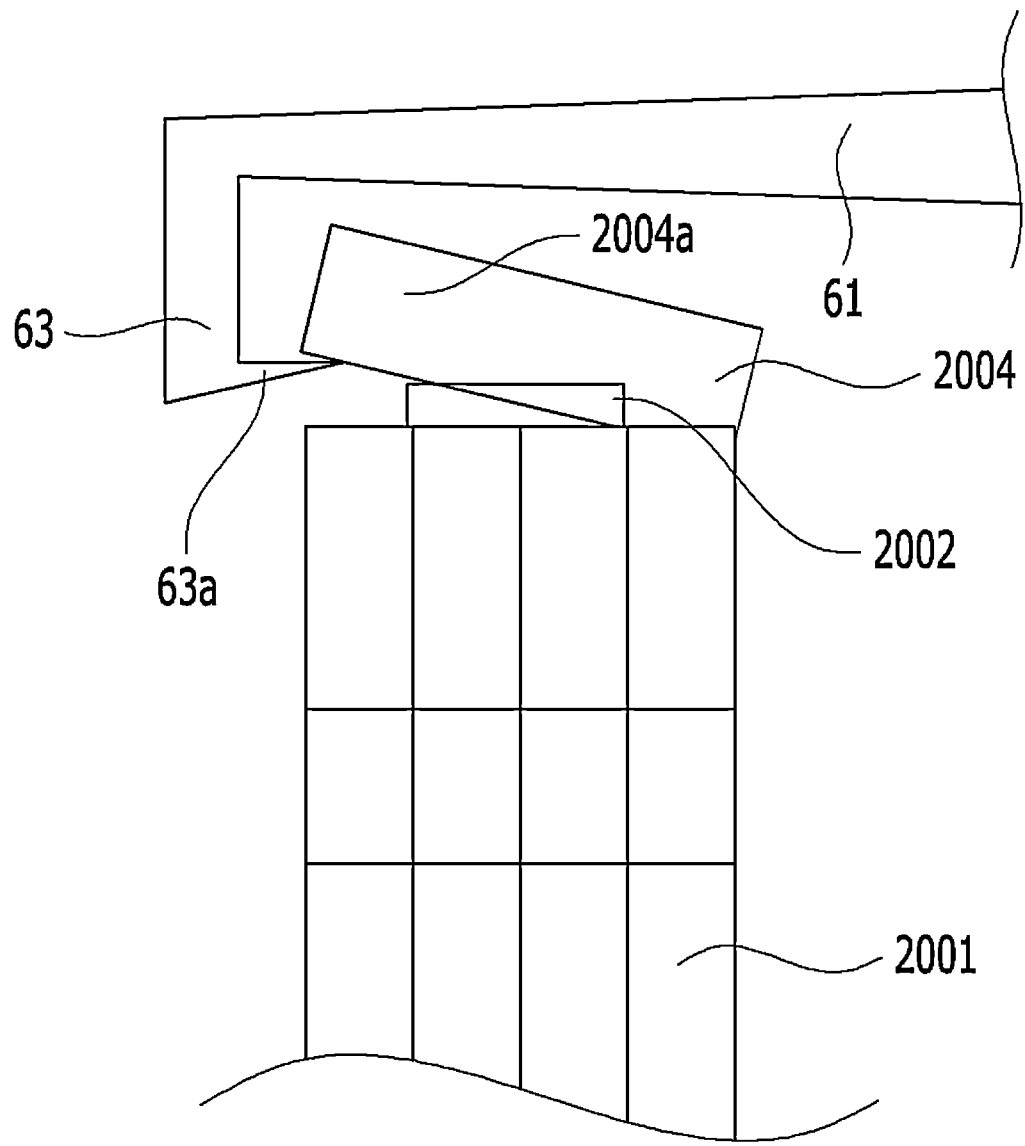
FIG. 7 is a diagram illustrating that the plug separation unit 60 separates a plug 2004 from the sensor housing 2001 when the gripping element 21 releases the clamping according to an embodiment of the present disclosure.

Referring to FIGS. 6 and 7, the plug separation unit 60 may be provided to separate the plug 2003 covering the sensor 2002 from the sensor 2002. Alternatively, the plug separation unit 60 may be provided to separate the plug 2003 from the sensor housing 2001. In this case, the plug separation unit 60 may separate the plug 2003 from the sensor or sensor housing by releasing the clamping of the gripping element 21.

In one embodiment, the storage sensor 44 may sense whether the magnet 2003 is loaded in the storage box 41, so the release of the clamping may be controlled to be applied. As the gripping element 21 releases the clamping of the sensor housing 2001 by the operating element 23 and moves to one side, the plug separation unit 60 may move to one side along with the gripping element 21 and the plug 2004 may be separated from the sensor housing 2001. The plug separation unit 60 may include an extension element 61 and a separation element 63.

Referring to FIG. 7, the extension element 61 may extend from the main body 10 to the sensor housing 2001 of the unmanned marine observation apparatus 2000. In one embodiment, the extension element 61 may extend upward from the main body 10 in order to separate the plug 2004 covering the sensor 2002 from the top of the sensor housing 2001, and then extend to the unmanned marine observation apparatus 2000. In addition, the extension element 61 may extend obliquely to the upper side and to one side where the unmanned marine observation apparatus 2000 is positioned. That is, the extension element 61 suffices to have a shape that extends to the top of the sensor housing 2001 for removing the plug 2004, in addition to the shape illustrated in FIG. 7.

The separation element 63 is configured to extend from one end of the extension element 61 toward the plug 2004. In one embodiment, the separation element 63 may be configured to be bent and extended downward from one end of the extension element 61 to separate the plug 2004 from the sensor housing 2001 according to the movement of the mounting device 1 of a signal checking apparatus for an unmanned marine observation apparatus.

As illustrated in FIG. 7, as the gripping element releases the clamping and moves to one side, at least a portion of the separation element may be inserted between the plug and the unmanned marine observation apparatus to separate the plug. In one embodiment, a claw 63a may be formed at one end of the separation element 63 so that to be inserted between the plug 2004 and the sensor housing 2001.

The claw 63a may have a shape that tapers toward an end portion. As the gripping element 21 releases the clamping of the sensor housing 2001 and moves to one side, the claw formed on one end of the separation element 63 is inserted between the plug 2004 and the sensor housing 2001, and then plugs 2004 falls off from the sensor housing 2001 to expose the sensor 2002, so the marine environment sensing may be normally performed within the sea. In this case, as described above, the release of the clamping by the gripping element 21 may be applied by the control unit when the loading of the magnet 2003 in the storage box 41 is sensed.

The above description of the present disclosure is for illustrative purposes, and those skilled in the art to which the present disclosure pertains will understand that it is possible to be easily modified to other specific forms without changing the technical spirit or essential features of the present disclosure. Therefore, it is to be understood that the exemplary embodiments described above are illustrative rather than being restrictive in all aspects. For example, respective components described as a single form may be implemented in a distributed manner, and similarly, components described as being distributed may also be implemented in a combined form.

It is to be understood that the scope of the present disclosure will be defined by the claims rather than the above-mentioned description and all modifications and alternations derived from the claims and their equivalents are included in the scope of the present disclosure.

What is claimed is:

1. A mounting device of a signal checking apparatus for an unmanned marine observation apparatus, comprising:
  a main body;
  a fixture that is detachably connected to the unmanned marine observation apparatus;
  a signal checking apparatus holder that extends in at least one direction and is formed to mount a signal checking apparatus on one side thereof; and
  a state inspection unit that inspects one or more of whether a magnet for operating a sensor of the unmanned marine observation apparatus is removed and whether a plug covering the sensor is removed as a state before the unmanned marine observation apparatus is dropped,
  wherein as the fixture is connected to a portion of the unmanned marine observation apparatus, the signal checking apparatus mounted on the signal checking apparatus holder allows the unmanned marine observation apparatus to check signal transmission of the unmanned marine observation apparatus at a fixed position with respect to a portion of the unmanned marine observation apparatus,
  wherein the fixture includes:
  a gripping element that is provided to surround at least a portion of the unmanned marine observation apparatus; and
  an operating element that controls the gripping element so that the gripping element clamps a portion of the unmanned marine observation apparatus,
  wherein the state inspection unit includes:
  a storage box that has an internal space; and
  a storage sensor that detects whether the magnet and plug are loaded in the storage box.

2. The mounting device of claim 1, wherein it is controlled whether the gripping element release the clamping depending on a loading state in the storage box detected by the storage sensor.

3. A mounting device of a signal checking apparatus for an unmanned marine observation apparatus, comprising:
  a main body;
  a fixture that is detachably connected to the unmanned marine observation apparatus;
  a signal checking apparatus holder that extends in at least one direction and is formed to mount a signal checking apparatus on one side thereof;
  a state inspection unit that inspects one or more of whether a magnet for operating a sensor of the unmanned marine observation apparatus is removed and whether a plug covering the sensor is removed as a state before the unmanned marine observation apparatus is dropped; and
  a plug separation unit that separates the plug covering the sensor of the unmanned marine observation apparatus from the sensor,
  wherein as the fixture is connected to a portion of the unmanned marine observation apparatus, the signal checking apparatus mounted on the signal checking apparatus holder allows the unmanned marine observation apparatus to check signal transmission of the unmanned marine observation apparatus at a fixed position with respect to a portion of the unmanned marine observation apparatus,
  wherein the fixture includes:
  a gripping element that is provided to surround at least a portion of the unmanned marine observation apparatus; and
  an operating element that controls the gripping element so that the gripping element clamps a portion of the unmanned marine observation apparatus,
  wherein the plug separation unit is provided to separate the plug according to the clamping release of the gripping element.

4. The mounting device of claim 3, wherein the plug separation unit includes:
  an extension element that extends from the main body toward the unmanned marine observation apparatus; and
  a separation element that extends from one end of the extension element toward the plug,
  wherein at least a portion of the separation element is inserted between the plug and the unmanned marine observation apparatus as the gripping element releases the clamping and moves to one side to separate the plug.

* * * * *